United States Patent
Ogasawara et al.

(10) Patent No.: US 7,583,567 B2
(45) Date of Patent: Sep. 1, 2009

(54) INFORMATION RETRIEVAL DEVICE

(75) Inventors: Akihiro Ogasawara, Toyokawa (JP); Yoshiki Ohzawa, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 481 days.

(21) Appl. No.: 11/480,993

(22) Filed: Jul. 6, 2006

(65) Prior Publication Data

US 2007/0047399 A1    Mar. 1, 2007

(30) Foreign Application Priority Data

Aug. 25, 2005  (JP)  ............... 2005-243889

(51) Int. Cl.
G11B 17/22    (2006.01)
(52) U.S. Cl. .................. 369/30.32; 369/30.27
(58) Field of Classification Search ............. 369/30.27, 369/30.32
See application file for complete search history.

(56) References Cited

U.S. PATENT DOCUMENTS

| 2005/0111329 A1 | 5/2005 | Nakae | |
| 2007/0133361 A1* | 6/2007 | Takahashi | 369/30.27 |

FOREIGN PATENT DOCUMENTS

| JP | A-7-37320 | 2/1995 |
| JP | A-08-212640 | 8/1996 |
| JP | A-2000-017920 | 1/2000 |
| JP | A-2001-357603 | 12/2001 |
| JP | A-2002-279464 | 9/2002 |
| JP | A-2003-109119 | 4/2003 |
| JP | A-2005-038487 | 2/2005 |

OTHER PUBLICATIONS

Office Action dated Nov. 28, 2008 in corresponding Japanese patent application No. 2005-243889 (and English translation).
Office Action mailed on Apr. 7, 2009 in corresponding Japanese patent application No. 2005-243889 (and English translation).
First Office Action issued from the Chinese Patent Office on Apr. 17, 2009 in the corresponding Chinese patent application No. 200610121292X (with English translation thereof).

* cited by examiner

Primary Examiner—Ali Neyzari
(74) Attorney, Agent, or Firm—Posz Law Group, PLC

(57) ABSTRACT

An information retrieval device having an insertion slot for inserting a medium having data to be retrieved includes an input unit for sending a signal upon accepting an input, an eject unit for ejecting the medium in the insertion slot and a control unit for controlling the eject unit upon receiving the signal from the input unit after an ejection instruction is accepted by the input unit. The signal to the control unit from the input unit after the ejection instruction on the input unit establishes an ejection prohibition control with the eject unit for prohibiting media ejection operation of the eject unit while an ejection prohibition state of the eject unit is brought into effect by using the input unit.

7 Claims, 4 Drawing Sheets

INFORMATION RETRIEVAL DEVICE

CROSS REFERENCE TO RELATED APPLICATION

This application is based on and claims the benefit of priority of Japanese Patent Application No. 2005-243889 filed on Aug. 25, 2005, the disclosure of which is incorporated herein by reference.

FIELD OF THE INVENTION

The present invention generally relates to an information retrieval device.

BACKGROUND OF THE INVENTION

Typically, a navigation system includes a CD/DVD player integrated therein for retrieval and/or playback of map data, music data, video data and other type of information. A user of the navigation system can display those data on a display of the navigation system or can playback those data for listening/viewing in a vehicle.

The CD/DVD player or a DVD-ROM drive for data retrieval has an eject mechanism for ejecting a CD/DVD inserted therein. The CD/DVD is easily and readily replaced once the data in the medium is accessed, used, etc. or stored elsewhere for use. The CD/DVD is also replaced when, for example, new map data is published as an update for a road map. In those cases, the user can replace the CD/DVD by him/herself without asking a sales representative or a shop clerk of a dealership for replacement.

The navigation system is installed in a center portion of a console of a dashboard for the sake of operability, accessibility and aesthetics. However, it may be easy for a child or other unwanted user to operate the device and causes damage or the like. In this case, a child lock function for invalidating at least some operations performed on the navigation system is used to protect the navigation system from damage. For example, the navigation system disclosed in Japanese Patent Document JP-A-2000-17920 has a function that prevents unwanted operations performed on the navigation system from taking effect.

The navigation system in the vehicle is, as described above, easily accessible, and the information medium (e.g., CD/DVD etc.) in the navigation system is easily ejectable. Therefore, automobile dealerships prevent theft of the CD/DVD by removing those media from the CD/DVD drive.

However, the CD/DVD player can not be fully operated without having those media in the drive for demonstration purpose. Further, using the child lock device for preventing theft of the media is undesirable, because functions affected by the child lock device may be functions that a prospective customer wishes to try out. That is, the child lock device may reduce a customer's interest in purchasing the vehicle.

SUMMARY OF THE INVENTION

In view of the above-described and other problems, the present disclosure provides an information retrieval device that prohibits only ejection of an information medium from the device upon receiving a predetermined operation performed thereon without disabling other functions.

The information retrieval device in the present disclosure includes an insertion slot for accepting a medium, an input unit for accepting instructions, an eject unit for ejecting the medium, and a control unit for controlling the eject unit. The ejection of the medium from the slot is prohibited when ejection prohibition instruction is performed on the input unit. The ejection of the medium is prohibited either by controlling the input unit or by controlling the eject unit upon receiving the ejection prohibition instruction. That is, an input of medium ejection is prevented by controlling the input unit, or ejection operation of the eject unit is prevented by the control unit even when the input unit received the input of medium ejection. In this manner, ejection of the information medium is prohibited without sacrificing other functions of the information retrieval device.

The prohibition of ejection may be performed in the following manner. That is, an ejection button in a touch panel display may be removed from an input screen or may be disabled when the information retrieval device includes the touch panel display for receiving inputs/instructions. In this manner, ejection of the information medium is effectively prohibited.

The prohibition of ejection may also be performed in a different manner. That is, when the ejection button in the display is selected and operated by a remotely controlled pointer or cursor, the ejection button and/or the pointer may be removed from the input screen or may be disabled when the information retrieval device is in ejection prohibition condition due to the ejection prohibition instruction. In this manner, ejection of the information medium is effectively prohibited.

Further, the input unit may be physically covered by a covering when the information retrieval device is in ejection prohibition condition. In this manner, ejection of the information medium is effectively prohibited.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Embodiments of the present invention are described with reference to the drawings. Like parts have like numbers in each of the embodiments.

Figure 1:
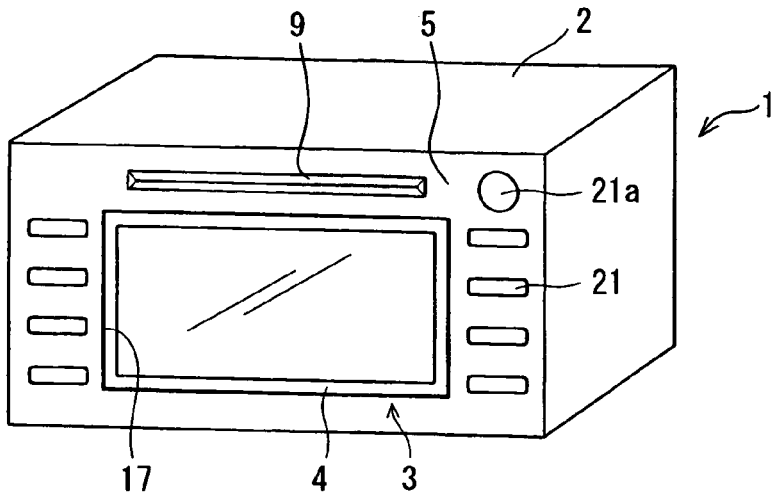
FIG. 1 shows a perspective view of a car navigation system in an embodiment of the present invention having a display unit in a vertical position.
Figure 2:
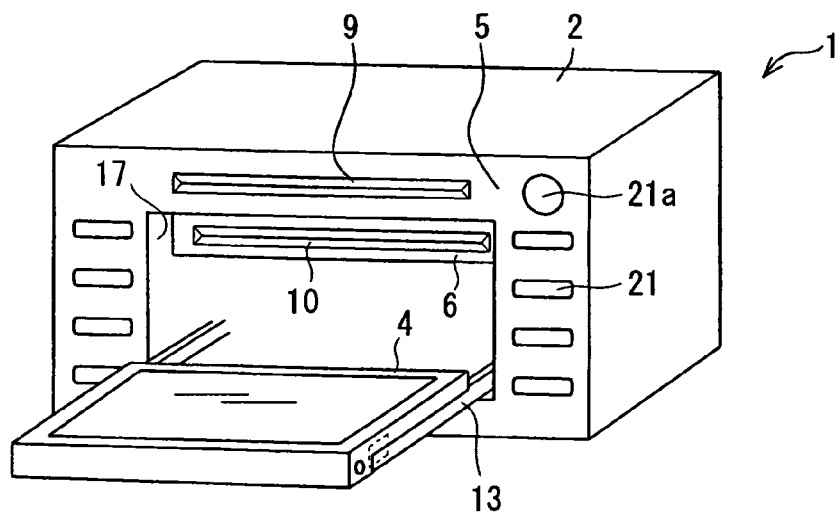
FIG. 2 shows a perspective view of a car navigation system in the embodiment having the display unit in a horizontal position.

An information retrieval device of the present embodiment is shown in perspective views in FIGS. 1 and 2. In the present embodiment, the information retrieval device is presented as a car navigation system 1 having an audio-video capability. A main body 2 of the car navigation system 1 includes a display unit 3, a screen 4, an audio system 5, and a DVD deck 6. The display unit 3 is disposed in a front portion of the main body 2, and the audio system 5 and the DVD deck 6 are also disposed in the front portion of the main body 2 vertically arranged in a row. The display unit 3 having the screen 4 attached thereon is movably and tiltably attached to the main body 2. The display unit 3 covers a front portion of the DVD deck 6 when it is vertically positioned.

The audio system 5 and the DVD deck 6 serve as information retrieval devices. As shown as a block diagram in FIG. 4, the audio system 5 includes a CD/DVD player 7 for retrieving music/video information from a music CD, a video DVD or the like. The DVD deck 6 includes a DVD drive 8 that serves as a map data input device for retrieving map data from map data DVD medium.

Figure 4:
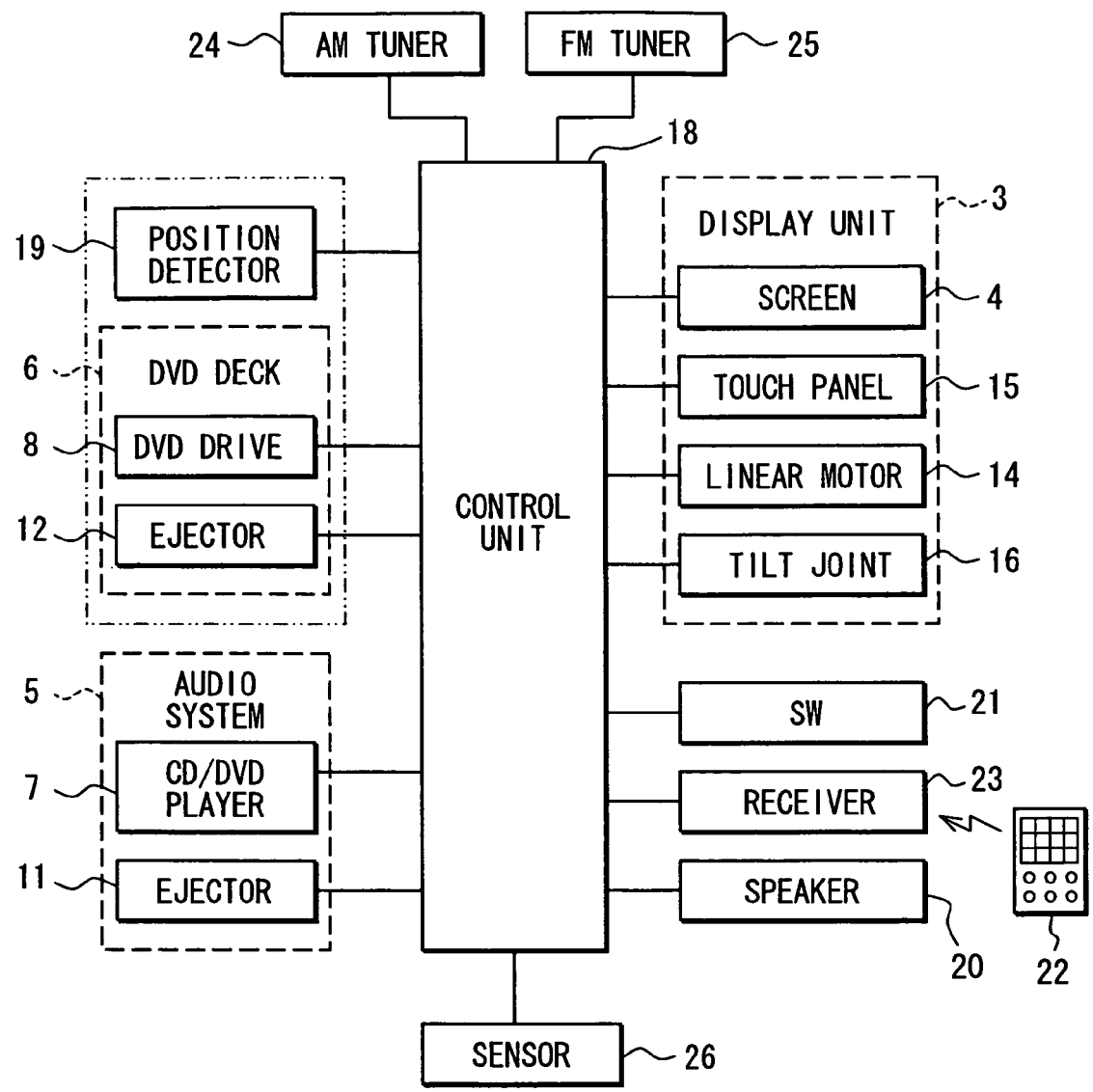
FIG. 4 shows a block diagram of the car navigation system in the embodiment.

The audio system 5 and the DVD deck 6 include insertion slots 9, 10, respectively, in the front portion. The music CD, the video DVD, the map data DVD medium are inserted and ejected via the insertion slots 9, 10. The audio system 5 and the DVD deck 6 also include motor-driven ejectors 11, 12 respectively for ejecting the music CD, the video DVD, the map data DVD medium or the like as shown in FIG. 4. The ejectors 11, 12 may be driven by a different mechanism other than the motor. The CD, the DVD and/or data medium are ejected from the insertion slots 9, 10 when an eject instruction is given to the car navigation system 1.

The main body 2 of the car navigation system 1 has a movable chassis 13 at a bottom. The movable chassis 13 is driven by a linear motor 14 in a front-rear direction. The movable chassis 13 rotatably supports a lower end of the display unit 3 and the screen 4. Therefore, the display unit 3 can be rotated and tilted around the lower side of the display unit 3. The screen 4 is, for example, a color liquid crystal display having a touch panel 15 installed thereon.

The movable chassis 13 includes a tilt joint 16 having a motor. The display unit 3 and the screen 4 rotates upward/downward in accordance with a slide movement of the movable chassis 13 between two positions around the tilt joint 16. That is, the screen 4 in a vertical position is housed in an opening 17 of a front side of the main body 2 as shown in FIG. 1 when the movable chassis 13 is fully retracted in the main body 2. In the vertical position, the screen 4 covers an entire area of the opening 17. The screen 4 tilts backward to be in a horizontal position in the chassis 13 as shown in FIG. 2, when the movable chassis 13 moves forward. The tilt movement of the screen 4 reverses when the movable chassis 13 retracts into the main body 2.

The front side of the main body 2 has a step structure. That is, as shown in FIG. 2, a front side of the DVD deck 6 recedes from a front face of the main body 2 and a front face of the audio system 5 by the thickness of the display unit 3. The front side of the DVD deck 6 is covered by the display unit 3 when the display unit 3 in the vertical position is housed in the opening 17. That is, the insertion slot 10 of the DVD deck 6 is usually covered by the display unit 3 and the screen 4.

The block diagram in FIG. 4 shows electrical connections between components of the car navigation system 1. That is, a control unit 18 is electrically connected to the CD/DVD player 7, the ejector 11 of the audio system 5, the DVD drive 8, the ejector 12 of the DVD deck 6, the screen 4, the linear motor 14, the touch panel 15, and the tilt joint 16 of the display unit 3. The control unit 18 is also electrically connected to a position detector 19, a speaker 20, button switches 21, a remote receiver 23 for receiving a signal from a remote controller 22, an AM tuner 24, an FM tuner 25 and a group of sensors 26.

The control unit 18 includes a microcomputer and other components such as a CPU, a ROM, a RAM, an I/O interfaces and the like. The ROM stores various programs for controlling a navigation function, a diagnosis function, and a data source management function for selecting a data source including the CD/DVD player 7, the DVD drive 8, the position detector 19, and the AM/FM tuners 24, 25. The data from the selected data source is outputted to the screen 4 and/or the speaker 20.

The position detector 19 includes a GPS receiver, a gyro, and a distance sensor (not shown in the figure) for detecting a current position. The speaker 20 is used to output audio sound stored in the data source such as the music CD, the video DVD or the like. The speaker 20 also outputs audio sound of radio programs received by the AM/FM tuner 24, 25, synthesized voice of navigation instruction or the like. The button switches 21 are installed on the front face of the main body 2, that is, on both sides of the opening 17. The button switches 21 are used to control the car navigation system 1 in combination with the touch panel 15 and the remote controller 22. The group of sensors 26 includes sensors in various positions of the car navigation system 1. The control unit 18 has a self-diagnosis function for diagnosing trouble/breakdown of the car navigation system 1 based on an input from the sensors 26.

The car navigation system 1 in the present embodiment prevents theft of the music CD, the video DVD, map data DVD medium used in the audio system 5 and/or the DVD deck 6 either mechanically or electrically disabling an ejection mechanism/functionality upon receiving an ejection prohibition operation. Prohibition and permission of the ejection of the CD/DVD medium are achieved in the following manner.

The audio system 5 has a mechanical button switch 21a that is dedicated to be used as an eject button as shown in FIG. 1. The audio player 5 ejects the CD/DVD medium by using the ejector 11 when the button switch 21a is pressed in a normal condition.

Figure 3A:
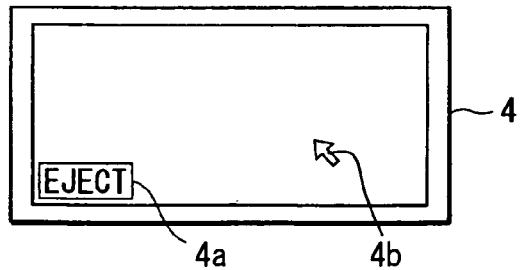
FIG. 3A shows a front view of the display unit having an eject button displayed on a display screen.
Figure 3B:
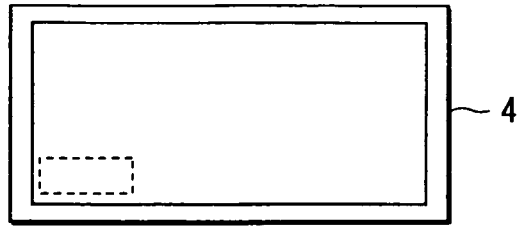
FIG. 3B shows a front view of the display unit with the eject button hidden from view.

The DVD deck 6 displays an eject button 4a on the screen 4 when the DVD medium is inserted in the DVD drive 8 from the insertion slot 10 as shown in FIG. 3A. That is, the eject button 4a is electrically displayed as a square button area having "Eject" text displayed therein in a lower left corner of the screen 4. When the screen 4 is touched over the eject button 4a, the ejector 12 in the DVD deck 6 is activated for ejecting the medium in the DVD drive 8.

The ejection prohibition operation applied to the car navigation system 1 has the following effect on the operation scheme of the audio system 5 and the DVD deck 6. That is, in a ejection prohibition condition, the audio system 5 does not respond to the operation of the eject button 21a. Further, the eject button area 4a on the screen 4 is hidden, thereby prohibiting the ejection instruction operation for the DVD deck 6. The operation scheme of prohibition of the ejection operation is described in detail in the following with reference to flowcharts in FIGS. 5 and 6.

Figure 5:
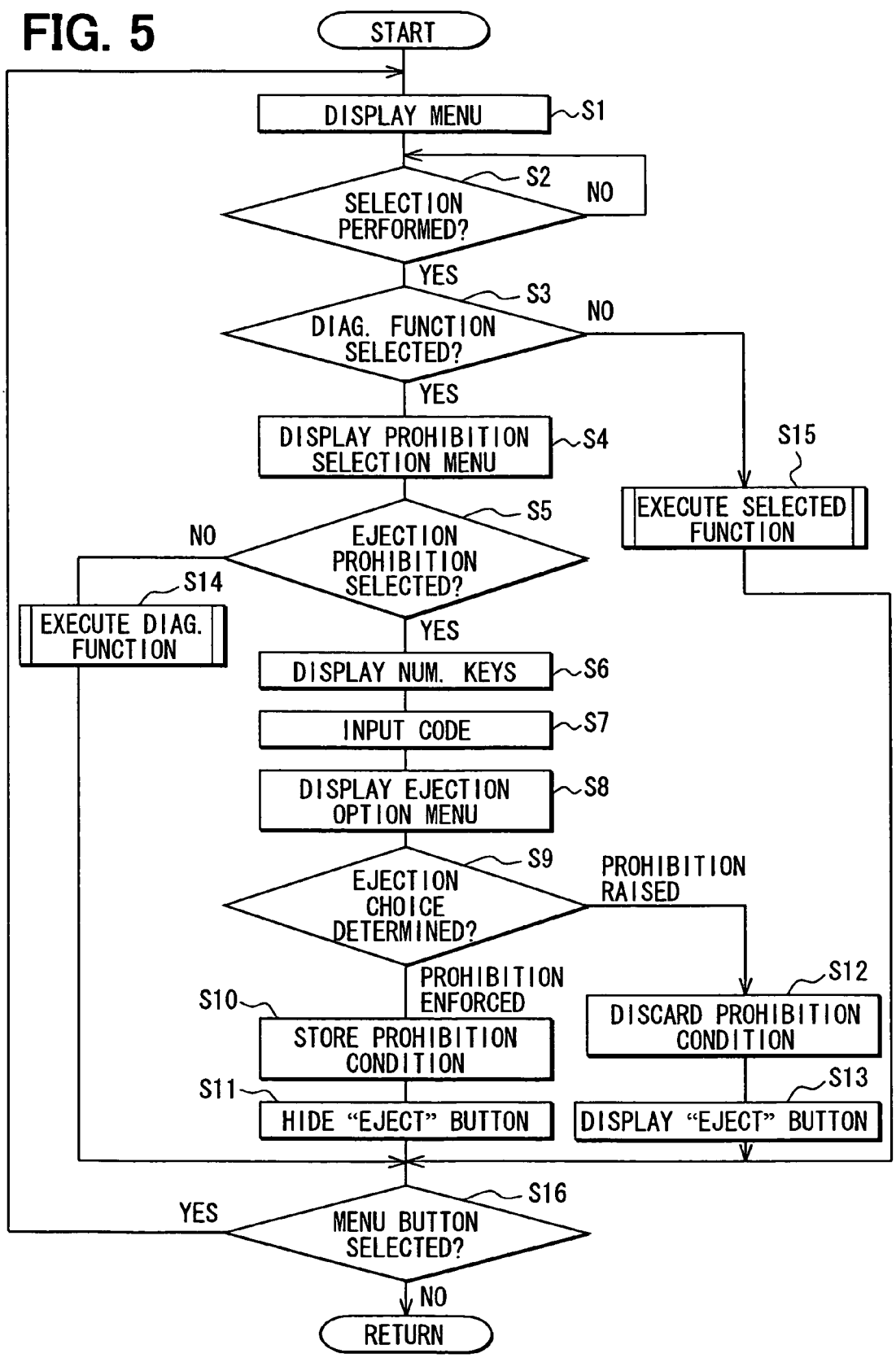
FIG. 5 shows a flowchart of a process for setting an ejection prohibition/permission condition.

FIG. 5 shows a flowchart of disabling/enabling process of the ejection functionality performed by the control unit 18 upon receiving an ejection prohibition operation and an ejection permission operation.

As shown in FIG. 5, the control unit 18 starts execution of a routine of a process control program when a power supply for the car navigation system 1 is turned on. That is, in step S1, the program displays an initial menu on the screen 4. The menu is displayed for allowing a user to select an available function or functions such as a navigator, an audio-video player, a radio, a diagnosis function or the like. In the present embodiment, ejection prohibition/permission condition settings are included in the diagnosis function. In this manner, that is, having hierarchically structured menus, accessibility to the ejection prohibition/permission condition setting is carefully controlled and protected from an unwanted operation by children or the like.

In step S2, the program detects whether a user touches/contacts the touch panel 15. The program proceeds to step S3 if menu selection is performed on the touch panel 15 (step S2:YES). The process repeats step S2 (step S2:NO) until menu selection is performed on the panel 15.

In step S3, the process determines whether the diagnosis function is selected in the menu. The process proceeds to step S4 when the diagnosis function is selected by the user (step S3:YES). The process proceeds to step S15 when another function is selected (step S3:NO) in the menu by the user. For instance, upon selection of the navigation function in step S2, the navigation function under control of the control unit 18 is executed by determining the current position of the vehicle with the position detector 19, retrieving the map data from the DVD medium in the DVD deck 6 and displaying a road map on the screen 4. Upon selection of the player function, the audio-video player under control of the control unit 18 is executed by retrieving data from the CD/DVD medium in the audio system 5 and outputting the audio sound/visual signal to the speaker 20 and/or the screen 4. The radio program may also be outputted from the speaker 20 upon selection of a radio station in the menu on the screen 4.

In step S4, the process displays a prohibition selection menu on the screen 4. Then step S5, the process determines whether the user selects either of the ejection prohibition/permission function or the diagnosis function in the prohibition selection menu. The process proceeds to step S6 when the prohibition/permission function is selected (step S5:YES). The process proceeds to step S14 when the diagnosis function is selected (step S5:NO). That is, in step S14, the control unit 18 executes the diagnosis function by receiving diagnosis signals from the sensors 26 and displays a result of diagnosis based on the diagnosis signals on the screen 4.

In step S6, the process displays a numeric key on the screen 4. The process then proceeds to step S7.

In step S7, the process receives an input from the numeric key displayed on the screen 4. The process proceeds to step S8 once the numeric input matches a predetermined code.

In step S8, the selection menu gives the user the option of whether to prohibit or permit ejection of the media. The process proceeds to step S9 after displaying the selection menu.

In step S9, the process determines which condition is selected in the menu on the screen 4. That is, a choice of the ejection prohibition condition or ejection permission condition is detected by the touch panel 15. The process proceeds to step S10 when the ejection prohibition condition is selected (step S9:PROHIBITION). The process proceeds to step S12 when the ejection permission condition is selected (step S9:PERMISSION).

In step S10, the process stores information that the car navigation system 1 is in an ejection prohibition condition in the RAM. The process proceeds to step S11 after storing the information on the system condition.

In step S11, the process hides the "Eject" button 4a in the screen 4. The process proceeds to step S16 after step S11.

In step S12, the car navigation system 1 is put in an ejection permission condition. The process proceeds to step S13 after discarding the information on the system condition.

In step S13, the process displays the "Eject" button in the screen 4. The process proceeds to step S16 after step S13.

In the above-described manner, the system condition of the car navigation system 1 is selected and determined.

In step S16, the process determines whether a return instruction to the initial menu is provided. The process returns to step S1 and displays the menu on the screen 4 when the return instruction is provided (step S16:YES). The process concludes execution of the routine when the return instruction is not provided (step S16:NO). That is, the navigation function with a map display or the audio player function with a music piece title/DVD video display may be executed in the car navigation system 1. The road map display on the screen 4 may be accompanied by the music of the CD/radio station from the speaker 20. The screen 4 continually displays a "menu" button for returning to the initial menu. Upon returning to the initial menu, the car navigation system 1 allows the user to select a desired function in the menu.

Figure 6:
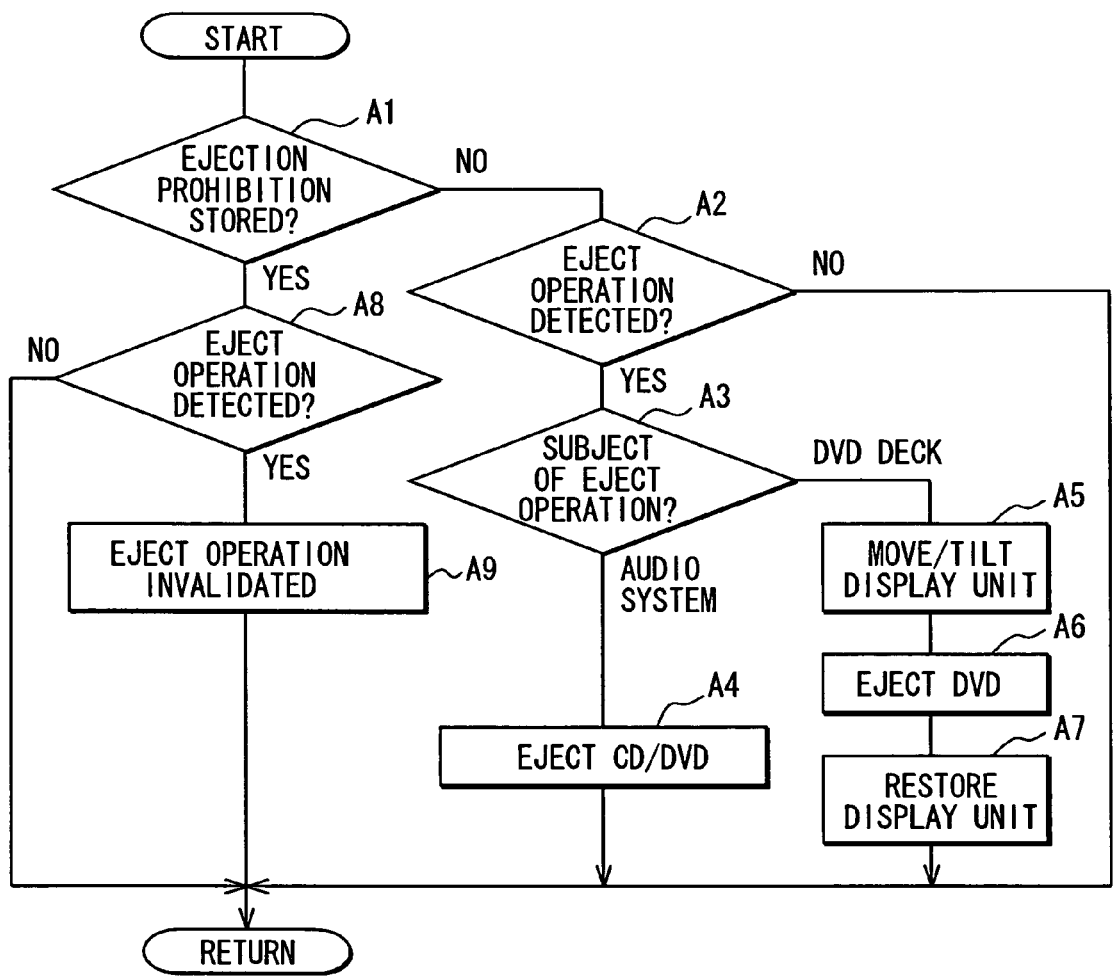
FIG. 6 shows a flowchart of a process for accepting an eject operation.

FIG. 6 shows a flowchart of an eject operation handling process in the control unit 18. The control unit 18 iterates execution of a routine of the eject operation handling process at a predetermined interval.

In step A1, the process determines whether the ejection prohibition condition is stored in the RAM. When the ejection prohibition condition is not stored in the RAM (step A1:NO), the process proceeds to step A2. When the ejection prohibition condition is stored in the RAM (step A1:YES), the process proceeds to step A8.

In step A2, the process determines whether an eject operation has taken place. When the eject operation has taken place, the process proceeds to step A3 (step A2:YES). When the eject operation has not taken place (step A2:NO), the process concludes execution of the routine.

In step A3, the process determines subject system of the eject operation. That is, when the user has operated the button switch 21a, the process determines that the subject system is the audio system 5 (step A3:AUDIO PLAYER), and the process proceeds to step A4. When the user has operated the "Eject" button on the screen 4, the process determines that the subject system is the DVD deck 6 (step A3:DVD DECK), and the process proceeds to step A5.

In step A4, the process controls the ejector 11 of the audio player 5 for ejecting the music CD or the video DVD from the insertion slot 9. The process concludes execution of the routine after completing this step.

In step A5, the process controls the linear motor 14 and the tilt joint 16 for causing the display unit 3 to be in the horizontal position on the movable chassis 13. After controlling the movement of the display unit 3, the process controls the ejector 12 of the DVD deck 6 for ejecting the map data DVD-ROM from the insertion slot 10 in step A6.

In step A7, the process reverses the movement of the display unit 3 after the user removed the DVD-ROM from the insertion slot 10. The process controls the linear motor 14 and the tilt joint 16 for causing the display unit 3 to return to the vertical position.

In step A8, the process determines whether an eject operation has taken place. When the eject operation has taken place, the process proceeds to step A9 (step A8:YES). When the eject operation has not taken place (step A8:NO), the process concludes execution of the routine.

In step A9, the process invalidates the button operation by the user on the button switch 21a (i.e., prohibition of the eject operation on the audio system 5), or the "Eject" button being hidden from the screen 4 disables the operation of the eject button 4a itself by the user (i.e., prohibition of the eject operation on the DVD deck 6).

The car navigation system 1 in the present embodiment disables the eject operation directed to control the ejector 11 or 12 when the ejection prohibition condition is stored in the system. That is, the eject operation on the audio system 5 by operating the eject button 21a is invalidated or the "Eject" button on the screen 4 is hidden for disabling the eject operation itself on the DVD deck 6. Therefore, a vehicle having the car navigation system 1 for display in a showroom of a dealership can safely use the music CD, the video DVD, and/or the map data DVD in the information retrieval device of the car navigation system 1 for demonstration purpose. That is, theft of the information medium can be effectively prevented by setting the ejection prohibition condition on the information retrieval device.

The ejection prohibition condition is stored in the RAM and stays effective after turning off the car navigation system 1 as long as the backup power supply, i.e., a main battery in the vehicle, is in proper condition.

Although the present invention has been fully described in connection with the preferred embodiment thereof with reference to the accompanying drawings, it is to be noted that various changes and modifications will become apparent to those skilled in the art.

For example, the "Eject" button 4a on the screen 4 may be displayed and only the eject operation may be invalidated in the ejection prohibition condition. In addition, display of the "Eject" button 4a on the screen 4 may be, for example, grayed out for indicating the ejection prohibition condition. Furthermore, the "Eject" button 4a may be an hardware operation switch or a similar device instead of a button shape area on a touch screen 4.

Further, the eject operation may be inputted by using a JOG DIAL (registered trademark). For example, the screen 4 in FIG. 3A may display two eject buttons for operating the ejector 11 and the ejector 12, respectively having the texts such as "Audio Eject" and "Map Eject." The JOG DIAL is operated to cause a pointer 4b (e.g., an arrow sign) to be placed on one of the two eject buttons. Pressing the JOG DIAL causes the control unit 18 to detect the eject operation by the user and causes the ejector 11 or 12 to eject the medium inserted therein. When the ejection prohibition condition is effective, the eject buttons on the screen 4 may be hidden or the pointer 4b may be hidden. In addition, the eject operation may be invalidated without hiding the buttons or the pointer 4b on the screen 4. The eject operation controlled by the JOG DIAL may be associated with either one of the audio player 5 or the DVD deck 6.

Furthermore, the eject operation may be controlled by the remote controller 22.

Furthermore, the ejection prohibition condition may be stored in an external memory instead of the RAM in the control unit 18.

Furthermore, the eject operation of the DVD deck 6 may be controlled by an eject button switch. The eject button switch for the eject operation of the DVD deck 6 may be installed on a front face of the DVD deck 6, and the eject button switch on the front face of the DVD deck 6 may be exposed for operation when the display unit 3 is moved to the horizontal position. The eject button switch may remain covered behind the display unit 3 in the vertical position when the ejection prohibition condition is in effect. That is, operation of the linear motor 14 and the tilt joint 16 may be restricted for implementing the ejection prohibition condition of the DVD deck 6.

Furthermore, the information retrieval device includes not only CD/DVD drives but also devices for information retrieval such as a floppy disk drive, a MO disk drive, a magnetic tape drive or the like. Therefore, the medium for information retrieval may be floppy disks, MO disks, magnetic tapes or other medium. In addition, the medium for information retrieval may be a memory stick.

Furthermore, the ejectors 11, 12 may be driven by a mechanism that is different from a motor.

Such changes and modifications are to be understood as being within the scope of the present invention as defined by the appended claims.

What is claimed is:

1. An information retrieval device having an insertion slot for inserting a medium having data to be retrieved, comprising:

an input unit for sending a signal upon accepting an input;

an eject unit for ejecting the medium in the insertion slot; and a control unit for controlling the eject unit upon receiving the signal from the input unit after an ejection instruction is accepted as an input by the input unit, a display screen for displaying an eject button area; and a touch panel disposed on the display screen for detecting an operation, wherein the signal sent to the control unit from the input unit after the ejection instruction is accepted as an input by the input unit causes the control unit to establish an ejection prohibition control with the eject unit for prohibiting a media ejection operation of the eject unit, the touch panel is used as a part of the input unit, the media ejection operation of the eject unit is permitted when the control unit detects an operation in the eject button area on the touch panel and the ejection prohibition control has not been established, and the media ejection operation of the eject unit is prohibited by one of hiding the eject button area from the display screen and invalidating the signal from the display screen to the control unit upon detecting the operation in the eject button area.

2. An information retrieval device having an insertion slot for inserting a medium having data to be retrieved, comprising:

an input unit for sending a signal upon accepting an input;

an eject unit for ejecting the medium in the insertion slot; and a control unit for controlling the eject unit upon receiving the signal from the input unit after an ejection instruction is accepted as an input by the input unit, a display screen for displaying an eject button area and an input pointer; and a remote controller for controlling the input pointer, wherein the signal sent to the control unit from the input unit after the ejection instruction is accepted as an input by the input unit causes the control unit to establish an ejection prohibition control with the eject unit for prohibiting a media ejection operation of the eject unit, the remote controller is used as a part of the input unit, the media ejection operation of the eject unit is permitted when the control unit detects an operation of the input pointer in the eject button area and the ejection prohibition control has not been established, and the media ejection operation of the eject unit is prohibited by one of hiding the eject button area and/or the input pointer from the display and invalidating the signal from the remote controller to the control unit upon detecting the operation of the input pointer in the eject button area.

3. The information retrieval device as in claim 1 further comprising:

a cover for covering the input unit, wherein the control unit controls a position of the cover to obstruct the input to the input unit after the ejection prohibition control has been established.

4. The information retrieval device as in claim 2 further comprising:
a cover for covering the input unit, wherein the control unit controls a position of the cover to obstruct the input to the input unit after the ejection prohibition control has been established.

5. An information retrieval device comprising:
a memory;
a first insertion slot configured to receive a first medium with retrievable data stored thereon;
a display unit, including a display screen and touch screen, configured to display information, accept input, and transmit a signal based on accepted input;
a first eject unit configured to eject the first medium with retrievable data stored thereon;
a control unit configured to control operation of the memory, the first insertion slot, the display unit and the first eject unit, wherein
when the touch screen accepts an input indicating an ejection prohibition condition is to be maintained in the information retrieval device, the display unit transmits a signal to the control unit to prohibit ejection of the first medium with retrievable data stored thereon by the first eject unit,
the control unit causes the memory to store data indicating the ejection prohibition condition is to be maintained in the information retrieval device, and
so long as the memory stores the data indicating the ejection prohibition condition is to be maintained in the information retrieval device, the control unit prohibits ejection of the first medium with retrievable data stored thereon by the first eject unit by either causing the display unit to hide an eject button from the display screen or by invalidating an input indicating an ejection operation at the touch screen.

6. The information retrieval device according to claim 5, further comprising:
a second insertion slot configured to receive a second medium with retrievable data stored thereon;
a second eject unit configured to eject the second medium with retrievable data stored thereon; and
a dedicated eject button switch, wherein
the control is farther configured to control operation of the second insertion slot, the second eject unit, and the dedicated eject button switch, and
the control unit prohibits ejection of the second medium with retrievable data stored thereon by the second eject unit so long as the memory stores the data indicating the ejection prohibition condition is to be maintained in the information retrieval device.

7. The information retrieval device according to claim 6, wherein
the control unit prohibits ejection of the second medium with retrievable data stored thereon by the second eject unit by invalidating a button operation of the dedicated eject button switch.

* * * * *